(12) United States Patent
Lyle et al.

(10) Patent No.: US 9,129,264 B2
(45) Date of Patent: Sep. 8, 2015

(54) ELECTRONIC CALENDAR AUTO EVENT RESOLUTION SYSTEM AND METHOD

(75) Inventors: Ruthie D. Lyle, Durham, NC (US); Demethria J. Ramseur, Smyrna, GA (US)

(73) Assignee: GOOGLE INC., Mountain View, CA (US)

( * ) Notice: Subject to any disclaimer, the term of this patent is extended or adjusted under 35 U.S.C. 154(b) by 794 days.

(21) Appl. No.: 12/722,151

(22) Filed: Mar. 11, 2010

(65) Prior Publication Data
US 2010/0217644 A1    Aug. 26, 2010

Related U.S. Application Data

(62) Division of application No. 11/548,570, filed on Oct. 11, 2006.

(51) Int. Cl.
G06Q 10/00 (2012.01)
G06Q 10/10 (2012.01)
G06Q 10/06 (2012.01)

(52) U.S. Cl.
CPC ...... *G06Q 10/109* (2013.01); *G06Q 10/063116* (2013.01); *G06Q 10/1093* (2013.01); *G06Q 10/1095* (2013.01); *G06Q 10/1097* (2013.01)

(58) Field of Classification Search
USPC .............................................. 705/7.11–7.24
See application file for complete search history.

(56) References Cited

U.S. PATENT DOCUMENTS

| | | | | |
|---|---|---|---|---|
| 4,807,154 | A * | 2/1989 | Scully et al. .................. | 715/751 |
| 4,817,018 | A * | 3/1989 | Cree et al. ..................... | 715/751 |
| 4,866,611 | A   | 9/1989 | Cree et al. | |
| 5,050,077 | A * | 9/1991 | Vincent ......................... | 705/7.19 |
| 5,070,470 | A * | 12/1991 | Scully et al. ................... | 708/112 |
| 5,093,901 | A * | 3/1992 | Cree et al. ..................... | 715/753 |
| 5,113,380 | A * | 5/1992 | Levine .............................. | 368/10 |
| 5,124,912 | A * | 6/1992 | Hotaling et al. .............. | 705/7.19 |
| 5,261,045 | A   | 11/1993 | Scully et al. | |
| 5,323,314 | A * | 6/1994 | Baber et al. ................... | 705/7.19 |
| 5,692,125 | A * | 11/1997 | Schloss et al. ................ | 705/7.16 |
| 5,732,399 | A * | 3/1998 | Katiyar et al. ................ | 705/7.18 |

(Continued)

FOREIGN PATENT DOCUMENTS

EP    1109121 A2 *    6/2001    ............. G06F 17/60

OTHER PUBLICATIONS

"Participation Status on Computer Calendar Systems," Research Disclosure. No. 298. Feb. 1989. Kenneth Mason Publications Ltd.

*Primary Examiner* — Alan S Miller
(74) *Attorney, Agent, or Firm* — Young Basile Hanlon & MacFarlane P.C.

(57) ABSTRACT

A system and method for event resolution. The method includes determining whether a post-scheduled event or a pre-scheduled event conflicts with a scheduled event. The method further includes extracting details of the post-scheduled event or the pre-scheduled event and automatically populating a response with at least some of the extracted details. The method further includes sending the response with an accept indication when the post-scheduled event or the pre-scheduled event does not conflict with the scheduled event, or sending the response with a cancel indication when the post-scheduled event or the pre-scheduled event conflicts with the scheduled event, or sending the response with a tentatively accept indication when the post-scheduled event or the pre-scheduled event conflicts with the scheduled event.

22 Claims, 3 Drawing Sheets

(56) References Cited

U.S. PATENT DOCUMENTS

| | | | |
|---|---|---|---|
| 5,774,867 A * | 6/1998 | Fitzpatrick et al. | 705/7.19 |
| 5,933,810 A * | 8/1999 | Okawa | 705/5 |
| 5,963,913 A * | 10/1999 | Henneuse et al. | 705/7.13 |
| 6,016,478 A * | 1/2000 | Zhang et al. | 705/7.19 |
| 6,101,480 A * | 8/2000 | Conmy et al. | 705/7.18 |
| 6,167,379 A * | 12/2000 | Dean et al. | 705/7.18 |
| 6,216,110 B1 | 4/2001 | Silverberg | |
| 6,370,566 B2 * | 4/2002 | Discolo et al. | 709/206 |
| 6,636,888 B1 * | 10/2003 | Bookspan et al. | 709/203 |
| 6,732,103 B1 * | 5/2004 | Strick et al. | 1/1 |
| 6,781,920 B2 * | 8/2004 | Bates et al. | 368/10 |
| 6,988,128 B1 * | 1/2006 | Alexander et al. | 709/206 |
| 7,082,402 B2 * | 7/2006 | Conmy et al. | 705/7.19 |
| 7,096,232 B2 | 8/2006 | Doss et al. | |
| 7,222,156 B2 * | 5/2007 | Gupta et al. | 709/206 |
| 7,283,970 B2 * | 10/2007 | Cragun et al. | 705/7.19 |
| 7,299,193 B2 * | 11/2007 | Cragun et al. | 705/7.13 |
| 7,343,313 B2 * | 3/2008 | Dorenbosch et al. | 705/7.19 |
| 7,379,888 B1 | 5/2008 | Mahapatro | |
| 7,395,221 B2 | 7/2008 | Doss et al. | |
| 7,421,401 B2 * | 9/2008 | Demsky et al. | 705/7.19 |
| 7,519,663 B1 * | 4/2009 | Bostick et al. | 709/204 |
| 7,679,518 B1 * | 3/2010 | Pabla et al. | 340/573.1 |
| 7,747,752 B2 * | 6/2010 | Pedersen | 709/227 |
| 7,752,066 B2 * | 7/2010 | Doss et al. | 705/7.19 |
| 7,865,387 B2 * | 1/2011 | Mansour | 705/7.16 |
| 2001/0014866 A1 | 8/2001 | Conmy et al. | 705/9 |
| 2001/0037229 A1 * | 11/2001 | Jacobs et al. | 705/8 |
| 2001/0054072 A1 * | 12/2001 | Discolo et al. | 709/206 |
| 2002/0049733 A1 * | 4/2002 | Orlick | 707/1 |
| 2002/0131565 A1 * | 9/2002 | Scheuring et al. | 379/88.19 |
| 2002/0194246 A1 * | 12/2002 | Moskowitz et al. | 709/102 |
| 2003/0061087 A1 * | 3/2003 | Srimuang | 705/8 |
| 2003/0103415 A1 * | 6/2003 | Bates et al. | 368/28 |
| 2003/0130882 A1 * | 7/2003 | Shuttleworth et al. | 705/8 |
| 2003/0149605 A1 * | 8/2003 | Cragun et al. | 705/8 |
| 2003/0149606 A1 * | 8/2003 | Cragun et al. | 705/8 |
| 2003/0233265 A1 * | 12/2003 | Lee et al. | 705/8 |
| 2004/0064585 A1 | 4/2004 | Doss et al. | |
| 2004/0078436 A1 * | 4/2004 | Demsky et al. | 709/206 |
| 2004/0088362 A1 * | 5/2004 | Curbow et al. | 709/207 |
| 2004/0093290 A1 | 5/2004 | Doss et al. | |
| 2004/0111307 A1 * | 6/2004 | Demsky et al. | 705/8 |
| 2004/0128304 A1 * | 7/2004 | Rokosz | 707/102 |
| 2004/0193458 A1 * | 9/2004 | Bear | 705/5 |
| 2004/0221010 A1 | 11/2004 | Butler | |
| 2004/0261013 A1 * | 12/2004 | Wynn et al. | 715/511 |
| 2005/0038687 A1 * | 2/2005 | Galdes | 705/9 |
| 2005/0065832 A1 * | 3/2005 | Virta | 705/8 |
| 2005/0091095 A1 * | 4/2005 | Wilbrink et al. | 705/8 |
| 2005/0202817 A1 | 9/2005 | Sudit | |
| 2005/0256754 A1 * | 11/2005 | Nastacio | 705/8 |
| 2005/0273372 A1 * | 12/2005 | Bowne et al. | 705/5 |
| 2005/0288987 A1 | 12/2005 | Sattler et al. | |
| 2006/0031326 A1 * | 2/2006 | Ovenden | 709/206 |
| 2006/0047557 A1 * | 3/2006 | Bieselin et al. | 705/9 |
| 2006/0047577 A1 * | 3/2006 | Dietz et al. | 705/26 |
| 2006/0123011 A1 * | 6/2006 | Stillion et al. | 707/10 |
| 2006/0184885 A1 * | 8/2006 | Hayes et al. | 715/753 |
| 2006/0218027 A1 * | 9/2006 | Carrion | 705/8 |
| 2006/0293943 A1 * | 12/2006 | Tischhauser et al. | 705/9 |
| 2007/0005409 A1 * | 1/2007 | Boss et al. | 705/8 |
| 2007/0008911 A1 * | 1/2007 | MacFarlane et al. | 370/260 |
| 2007/0022075 A1 * | 1/2007 | Horvitz et al. | 706/52 |
| 2007/0239509 A1 * | 10/2007 | Kaminsky et al. | 705/9 |
| 2007/0250366 A1 * | 10/2007 | Nurmi | 705/8 |
| 2007/0282654 A1 | 12/2007 | Sarkar | |
| 2008/0033778 A1 * | 2/2008 | Boss et al. | 705/9 |
| 2008/0046514 A1 * | 2/2008 | Daughtry et al. | 709/204 |
| 2008/0134041 A1 * | 6/2008 | Zinn | 715/733 |
| 2008/0162250 A1 * | 7/2008 | Carrion | 705/9 |
| 2008/0189624 A1 * | 8/2008 | Chotai et al. | 715/753 |
| 2008/0243582 A1 * | 10/2008 | Chen et al. | 705/9 |
| 2009/0125818 A1 * | 5/2009 | Ritter et al. | 715/753 |
| 2009/0138283 A1 * | 5/2009 | Brown | 705/3 |

* cited by examiner

ELECTRONIC CALENDAR AUTO EVENT RESOLUTION SYSTEM AND METHOD

CROSS REFERENCE TO RELATED APPLICATIONS

The present invention is a divisional application of co-pending U.S. application Ser. No. 11/548,570, filed on Oct. 11, 2006, the contents of which are incorporated herein by reference in its entirety.

FIELD OF THE INVENTION

The invention generally relates to a system and method of electronic calendar automatic event resolution and, more particularly, to a system and method configured to provide event resolution for both pre-scheduled and post-scheduled events.

BACKGROUND OF THE INVENTION

Electronic office tools are ubiquitous in today's business environments. These electronic office tools include, for example, calendars, appointment books, address books and contact lists, to name a few. In fact, these tools are typically an extension of features provided by time management software such as desk accessory packages and mainframe office automation systems. These tools are often packaged by original equipment manufacturers. For example, International Business Machines Corp. (IBM) packages many of these features in Lotus Notes®. (IBM and Lotus Notes are trademarks of International Business Machines Corporation in the United States, other countries, or both).

Calendaring and other time management systems are very powerful tools. For example, these tools allow a user to schedule appointments such as team meetings or other appointments and notify and/or remind participants by email of such appointments. Calendar features also include automatic event reminders, including mobile phone notifications, which instantly bring up calendar events with built-in search tools.

By way of a more specific example, electronic calendars have special functionality which allows users to track scheduled events, add events to a calendar, and notify/invite other individuals of the scheduled events. In addition, many electronic calendars permit the user to denote blocks of time for scheduled vacation, either as half day vacations or full day vacations, site holidays and other customized out of the office events. In fact, some calendars permit a sharing feature to allow other users to see upcoming events on another user's calendar.

These functions are all very useful when organizing and scheduling events and, in particular managing time. However, it is not uncommon for scheduled events to conflict with one another, unbeknownst to the user. For example, a user may have scheduled a block of time for an out of office event such as a vacation, but also accepted an appointment for a business meeting during this same time. This would typically occur, as one example, by a colleague sending a recipient an email invitation requesting a meeting at a certain time and date. The recipient would accept the invitation by "hitting" the "accept" button, which, in turn, would automatically notify the sender of such acceptance. By doing so, the business meeting would automatically be placed into the recipient's calendar at the accepted time and date. However, unwittingly, the accepted invitation may conflict with a scheduled vacation. This may not be realized, at all, or may be realized only after the recipient was looking through his/her calendar for other scheduled events.

Accordingly, there exists a need in the art to overcome the deficiencies and limitations described hereinabove.

SUMMARY OF THE INVENTION

In a first aspect of the invention, a method comprises determining whether a scheduled event is confirmed and whether a user is designated as a chair of a meeting. When the user is designated as the chair and the scheduled event is confirmed, for each meeting conflicting with the scheduled event, the method cancels, reschedules the meeting to a non-conflicting time or performs an action. When the user is not designated as the chair and the scheduled event is confirmed, the method performs an action.

In another aspect of the invention, a method comprises determining whether a post-scheduled event or a pre-scheduled event conflicts with a scheduled event. The method further includes extracting details of the post-scheduled event or the pre-scheduled event and automatically populating a response with at least some of the extracted details. The method further includes sending the response with an accept indication when the post-scheduled event or the pre-scheduled event does not conflict with the scheduled event, or sending the response with a cancel indication when the post-scheduled event or the pre-scheduled event conflicts with the scheduled event, or sending the response with a tentatively accept indication when the post-scheduled event or the pre-scheduled event conflicts with the scheduled event.

In another aspect of the invention, a method is provided for deploying an application for event resolution. The method comprises providing a computer infrastructure being operable to: determine whether a post-scheduled event or a pre-scheduled event conflicts with a scheduled event; extract details of the post-scheduled event or the pre-scheduled event; automatically populate a response with at least some of the extracted details; and send the response. The response may include an accept indication when the post-scheduled event or the pre-scheduled event does not conflict with the scheduled event. The response may include a cancel indication when the post-scheduled event or the pre-scheduled event conflicts with the scheduled event. The response may include a tentatively accept indication when the post-scheduled event or the pre-scheduled event conflicts with the scheduled event.

In yet another aspect of the invention, a system comprising at least one of a hardware and software component is provided for event resolution between a scheduled event and at least one of a pre-scheduled event and post-scheduled event. The hardware and/or software component is configured to: determine whether there is a conflict between the scheduled event and at least one of the pre-scheduled event and post-scheduled event, if existing; update a calendar with a non-conflicting event; and notify a sender of the at least one of the pre-scheduled event and post-scheduled event that a recipient accepts, declines or tentatively accepts a time for the at least one of the pre-scheduled event and post-scheduled event, depending on a conflict.

In a further aspect of the invention, a computer program product comprises a computer usable medium having readable program code embodied in the medium. The computer program product includes at least one component to provide the method steps of the invention. The at least one component can also provide the functionality of the system of the invention.

DETAILED DESCRIPTION OF EMBODIMENTS OF THE INVENTION

The invention is directed to a system and method of electronic calendar automatic event resolution. In an embodiment of the invention, the method and system is configured to provide event resolution for both pre-scheduled and post-scheduled events that coincide with times in which the user will (or may) be unavailable, e.g., out of the office. The system and method of the invention will save the user time by automatically resolving meeting information using a set of predetermined choices to automate the process of dealing with events that coincide with scheduled conflicts such as, for example, time out of the office. Meetings are defined broadly to encompass teleconferences, lectures/seminars, or other events which require participation from the intended user. Possible resolutions may include, but not be limited to, automatically rescheduling and/or declining meetings. Additionally, by implementing the system and method of the invention, time to schedule events and notify others will be greatly reduced, compared with conventional systems. The invention can be implemented over any distributed network or stand-alone server, for example.

Figure 1:
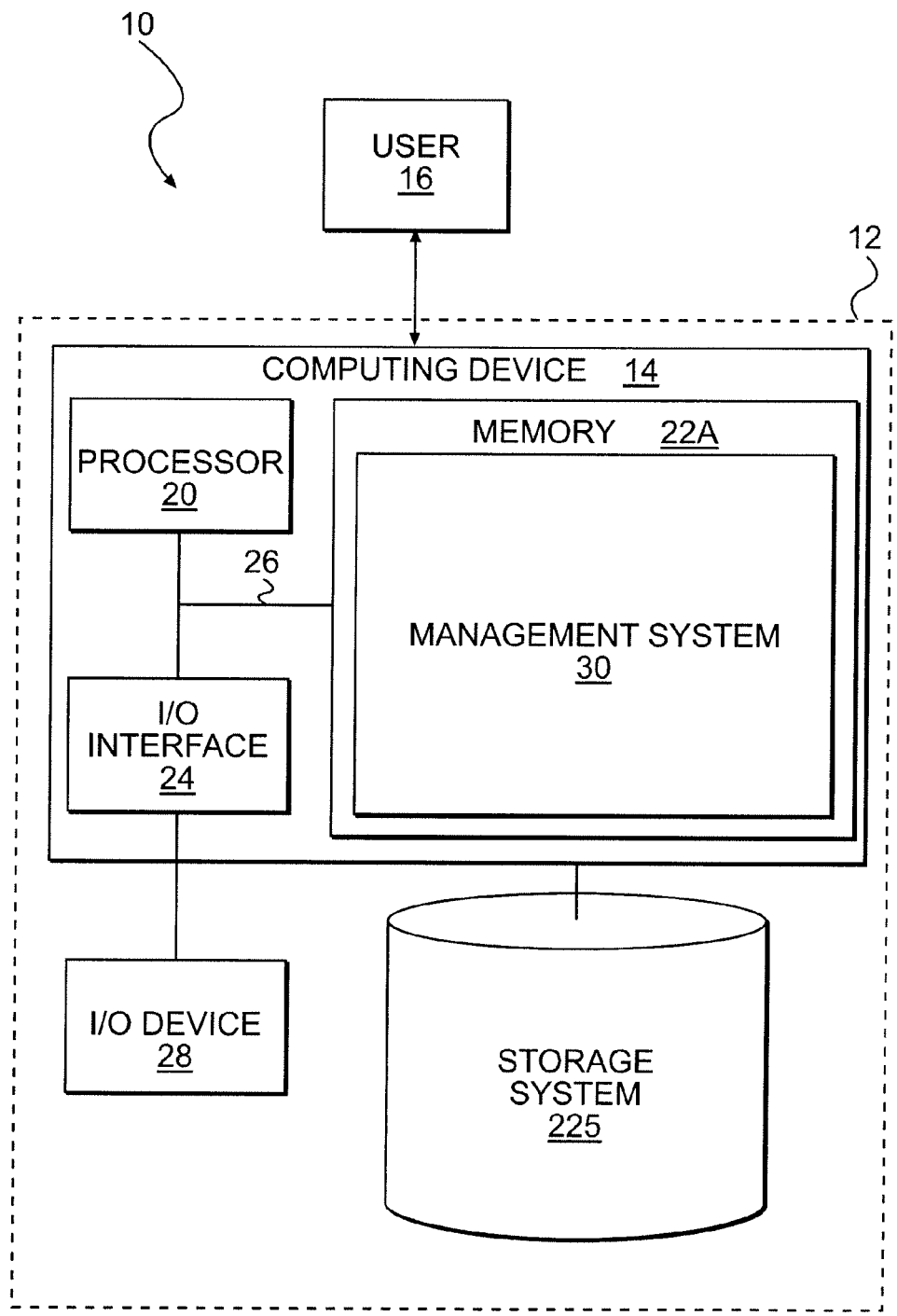
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that comprises a management system 30, which makes computing device 14 operable to perform electronic calendar automatic event resolution in accordance with the invention, e.g., processes described herein. The computing device 14 includes a processor 20, a memory 22A, an input/output (I/O) interface 24, and a bus 26. Further, the computing device 14 is in communication with an external I/O device/resource 28 and a storage system 22B.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the process described herein. Further, while performing the process described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. As discussed herein, the management system 30 enables the computer infrastructure 12 to provide electronic calendar automatic event resolution.

In embodiments, the invention provides a business method that performs the process steps of the invention on a subscription, advertising, and/or fee basis. That is, a service provider, such as a Solution Integrator, could offer to perform the processes described herein. In this case, the service provider can create, deploy, maintain, and support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In one embodiment, the invention is configured to reconcile both pre-scheduled and post-scheduled events. Pre-scheduled events may include events that are pre-scheduled prior to a time being denoted as out-of-office or other event blocked on the schedule. Post-scheduled events may include events that are scheduled after an out-of-office or other conflicting event is already blocked on the scheduled. A conflicting event may denote any event in which there is time blocked on the calendar, whether that is a meeting or other scheduled event on the calendar.

In embodiments, the system and method is configured to determine if the out-of-office or other conflicting event (hereinafter referred to as "conflicting event") is definite or tentative. This may be accomplished by creating a profile that allows a user to indicate the number of days prior to an event to confirm the conflicting event. The system will prompt the user several days or other predetermined time period prior to the conflicting event to confirm the conflicting event. If the conflicting event is confirmed, automatic event notifications will be sent to other persons attempting to schedule an appointment, which would otherwise conflict with the conflicting event.

In further embodiments, in the event that the user cancels the conflicting event, it is possible to retrieve the pre-scheduled or post-scheduled event. By way of one example, pre-scheduled or post-scheduled events may be saved in a log file for future reference. Additional details can be included in the log file such as the original meeting date and the date rescheduled meeting date. The system and method further provides the ability to automatically restore the meeting details to the calendar after they have been removed. The log file will be utilized to allow this functionality.

In the case of a pre-scheduled event (e.g., an event is listed on the user's calendar prior to scheduling the conflicting event), the system and method can perform certain functions when a conflicting event is later scheduled. For example, for events that are chaired by a third party, the system and method of the invention is configured to perform the following functions:

1. In the case that the conflicting event (e.g., vacation) is tentatively scheduled, system and method of the invention is configured to update the response from "accept" to, e.g., "tentative accept pending vacation determination". The system and method may also send an update note (email) to the chair indicating the changed status.
2. In the case that the conflicting event is definite, the system and method of the invention is configured to update the response from "accept" to "decline". A prompt, via an email, for example, may be sent to the chair indicating the changed status.
3. In the case that the conflicting event is canceled, the system and method of the invention is configured to use the log to retrieve the scheduled information and restore the meeting details to the calendar. The system and method of the invention is configured to send a prompt, via an email, for example, to the chair indicating the changed status.

For events that are chaired by the user (recipient), the system and method of the invention is configured to perform the following functions:

1. In the case that the conflicting event is tentative or definite, the system and method of the invention is configured to delegate the meeting to someone else to chair. The system and method may retrieve information about the invited attendees from the log, and select one or more of these invited attendees as the chair. In the alternative approach, the system and method may parse an email sent to all invited attendees to determine attendee information such as, for example, names and contact information. The system and method can then notify such person(s) via email, for example. In the case that no chair can be found or a requested chair has declined the responsibility, the system and method is configured to automatically or via user prompt provide a "cancel" notice to the invited attendees.
2. In the case that the conflicting event is definite or tentative, the system and method is configured to cancel the meeting and send a cancellation notice to all invited attendees.
3. In the case that the conflicting event is cancelled, the system and method of the invention is configured to use the log to retrieve the scheduled information and restore the meeting details to the calendar. The system and method of the invention is configured to send a prompt, via an email, for example, to the invited attendees indicating the changed status, e.g., the meeting will proceed at the scheduled time.
4. In any scenario, the system and method is configured to automatically reschedule the meeting using the same invited attendees and meeting details. In one implementation, the meeting can be rescheduled is the available attendees are above a percentage of individuals that can attend the meeting.

In the case of a post-scheduled event, the system and method can perform certain functions when a conflicting event is scheduled as block of time on the calendar. For example, for conflicting events that are tentatively scheduled, the system and method of the invention is configured to perform the following functions:

1. In the case that the user receives a meeting invitation chaired by someone else, the system and method of the invention is configured to either tentatively accept or decline the meeting.
2. In the case that the user receives a meeting that someone wants to delegate to the user as the chair, the system and method of the invention is configured to:
   a. redelegate the chair to another attendee,
   b. tentatively accept/decline the delegation, or
   c. automatically reschedule the meeting using the same invited attendees and meeting details, in the manner described above.

Figure 2:
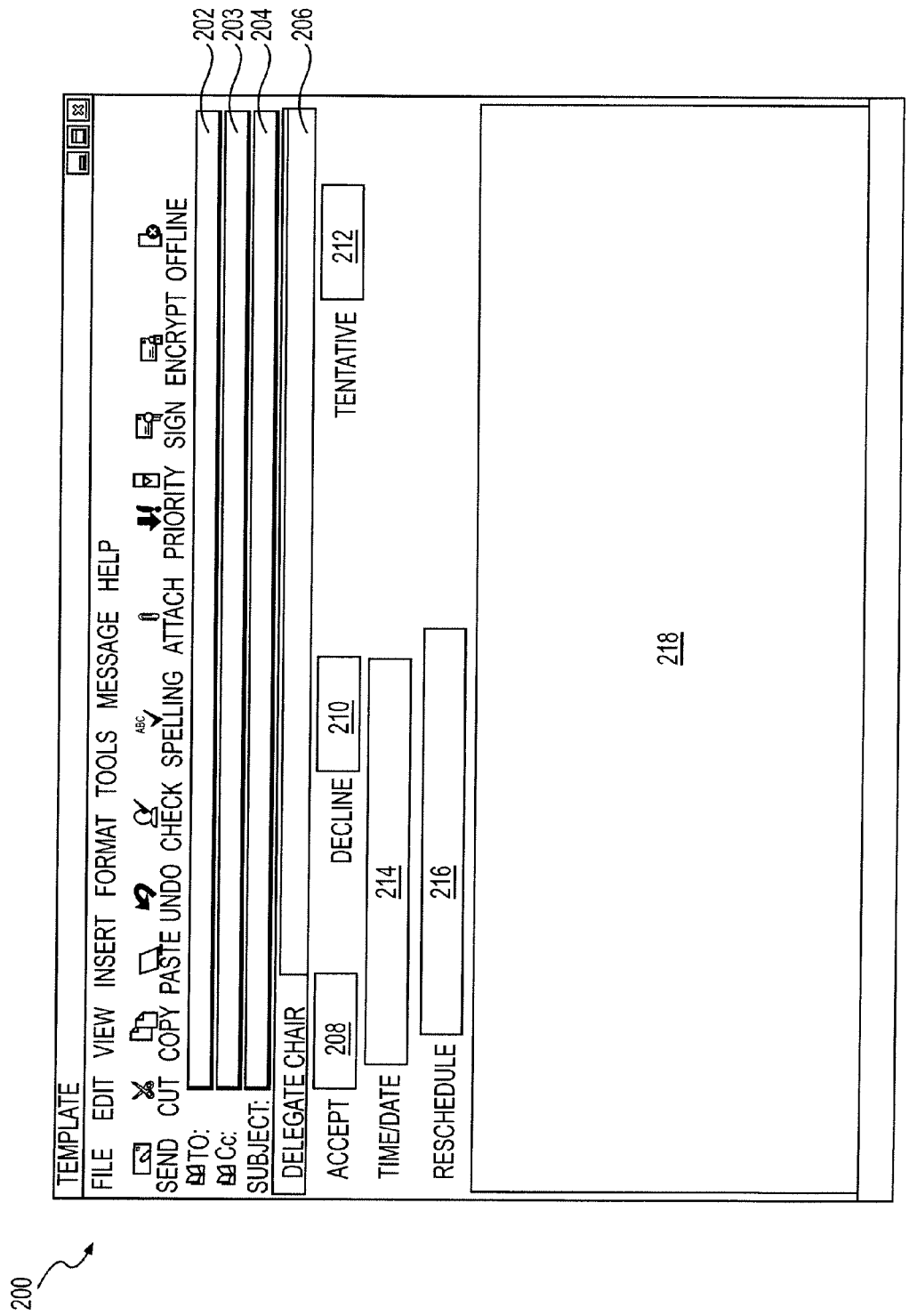
FIG. 2 shows a sample template used in implementing the invention.

In the case of a conflicting event is definitely scheduled, the system and method of the invention is configured to perform the following functions:

1. In the case that the user receives a meeting invitation chaired by someone else, the system and method is configured to decline and update the sender with a customized response using a template. A profile may be used, as discussed in greater detail below, which indicates a specific template to use for a particular person (for example sending a particular response to a higher level person/manager). An exemplary template is shown in FIG. 2, discussed in greater detail below.
2. In the case that the user receives a meeting that someone wants to delegate the user as the chair, the system and method of the invention is configured to:
   a. redelegate the chair to another attendee,
   b. tentatively accept/decline the delegation, or
   c. automatically reschedule the meeting using the same invited attendees and meeting details, in the manner described above.

In any of the above exemplary embodiments, the user may create a profile which could reside on both the server and the client machine, with the main copy being housed on the server for easy access from any client. In the profile, there may be a set threshold, e.g., percentage of individuals available, to select a reschedule date. The profile may contain but is not limited to:

(i) a user set of predetermined choices (to automate the process of dealing with events that coincide with days for which the user plans to be out of the office, for example);
(ii) templates for responding to scheduled conflicting events, configured for particular situations and/or persons (as should be understood by those of skill in the art);
(iii) an indication of the number of days that the user has to confirm the scheduled event prior to such scheduled event; and
(iv) an acceptable percentage of invited attendees required to execute an option such as, for example, 95% of the invited attendees.

FIG. 2 shows an exemplary template implemented in accordance with the invention. The exemplary template is used to respond to attendees of a meeting, in view of many different circumstances. For example, the template, generally shown as reference numeral 200, may be used when the recipient of an invitation is the chair of the meeting. Similarly, the template can easily be modified for various other scenarios, as described herein.

In one example, the template 200 includes a "to" field 202, a "CC" field 203 and a "subject" line field 204. In addition, the template 200 includes a "delegate chair" field 206, "accept" field 208, "decline" field 210 and "tentatively scheduled" field 212. Additionally, in embodiments, the template may include a "time/date" field 214 and "reschedule" field 216. Moreover, a "subject" field 218 may also be provided in the template 200. The template 200 may be an email, itself, or converted to an email, which one of ordinary skill in the art could easily implement.

In use, information may be extracted from an invitation email in order to populate or append to the template 200. For example, an invitation email may request "N" number of recipients to attend a meeting on a certain date and time, with recipient "1" being delegated as a chair. Recipient "1" may have a conflicting event, in which case, the system and method would extract the information from the invitation to populate the template 200. This information would include, for example, time and date of meeting, the recipients' email addresses, the subject of the meeting, etc. The recipient "1" may designate a new chair in field 218 and may decline the meeting via "decline" field 210 or alternatively reschedule the meeting using the "reschedule" field 216. Once all of the appropriate fields are populated, recipient "1" would then send the email to the remaining recipients.

Figure 3:
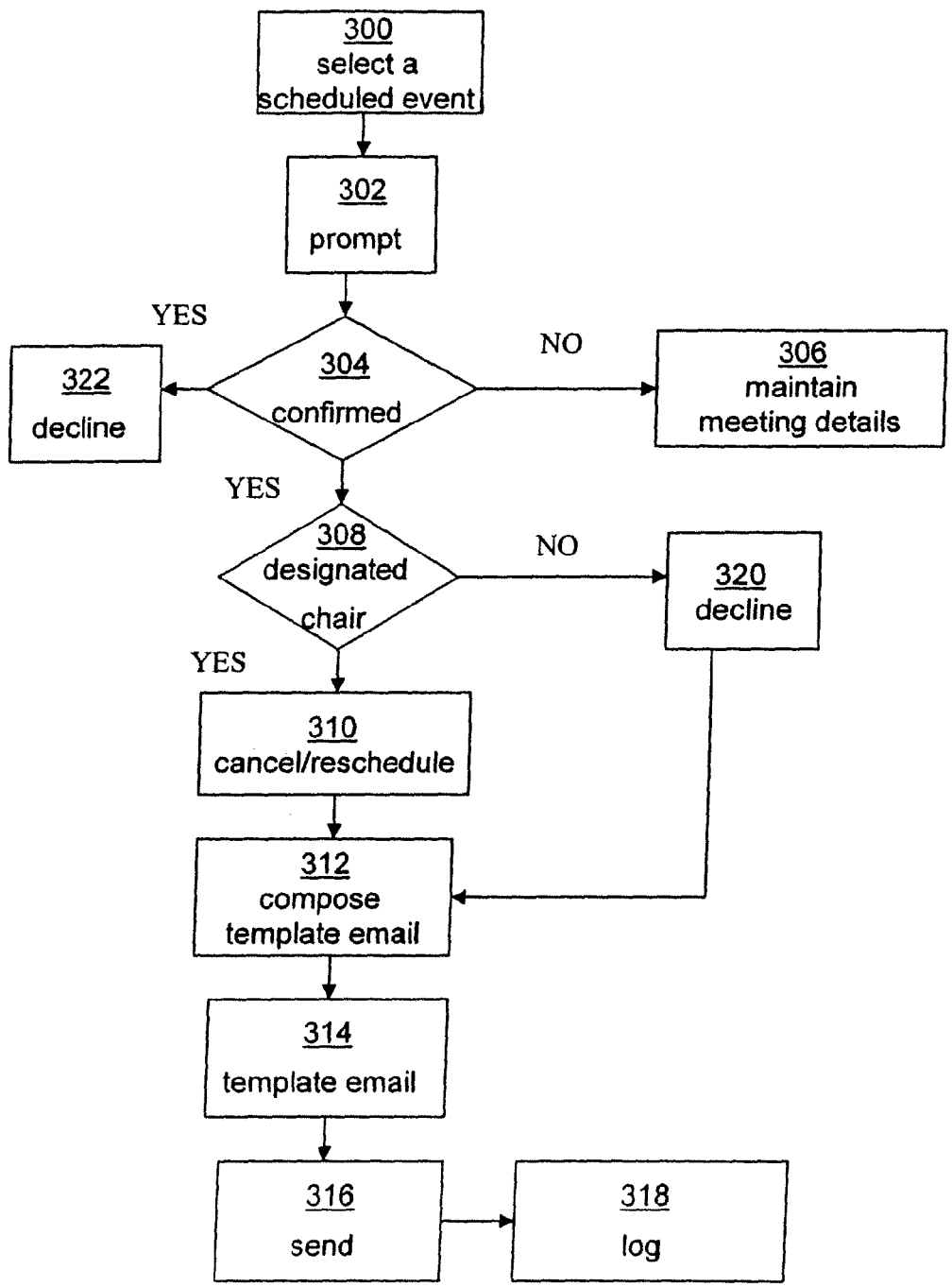
FIG. 3 is a flow chart of steps for implementing aspects of the invention.

FIG. 3 is a flow diagram implementing steps of the invention which may be implemented in the environment of FIG. 1. FIG. 3 may equally represent a high-level block diagram of the invention. The steps of FIG. 3 may be implemented and executed from either a server, in a client server relationship, or they may run on a user workstation with operative information conveyed to the user workstation to automatically resolve calendar events. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Referring back to FIG. 3, at step 300, the user selects a scheduled event. This scheduled event (also referred to above as the conflicting event) may be, for example, an out of office event such as a vacation. At step 302, the process prompts the user to confirm the scheduled event. This prompt may be provided at a predetermined time period prior to the scheduled event such as one week. The prompt may be a default period or may be provided by the user via any known mechanism such as a drop down menu or manual entry.

At step 304, the scheduled event may be confirmed. This may be accomplished by user input such as, for example, a pop up window that requires a user input, e.g., "confirm" or "not confirm" buttons. If the event is not confirmed, the process proceeds to step 306. At step 306, the process will maintain (e.g., not modify) the meeting details on the scheduled event day(s). As an option, the process will remove the scheduled event days from the calendar.

If the scheduled event is confirmed at step 304, the process proceeds to step 308. At step 308, a determination is made as to whether the user is designated as the chair of the meeting. If the user is designated as the chair of the meeting, at step 310, for each meeting being held on the scheduled event, the process will automatically cancel or reschedule the meeting to a non-conflicting time. At step 312, the process will compose a template email. The composition of the template email may be accomplished by extracting the invited attendees from meeting details and using this extracted information to populate (or append) the "to" section of the email. The process may additionally extract other information from the invitation such as, for example, the subject and use this extracted information to populate (or append) the "subject" line of the template. Similarly, the process may extract additional information such as, for example, meeting date, time, and subject and populate (or append) such information in the body of the template.

At step 314, the process will convert the template to an email. In an optional step, the template may already be an email, in which case the extracted information will be appended or populated directly to such email. At step 316, the email is sent to the invited attendees. At step 318, any or all of the extracted information may be written to a log file. The user can then refer back to the log file in the case that the scheduled event has been canceled. In such a case, the information in the log can be used to populate (or append) the appropriate fields of the email, requesting that the event be reinstated for the original date and time or rescheduled for another date and time. Also, the information from the log can be used to repopulate the calendar, thus setting up the meeting automatically.

If the user is not designated as the chair of the meeting at step 308, the process will proceed to step 320. At step 320, the process will automatically decline the meeting and thereafter process according to the steps 312, 314 and 316. In the composed email, a decline notification will be provided to the invited attendees.

As an alternative approach, if the scheduled event is confirmed at step 304, the process proceeds to step 322. At step 322, the process will provide an automatic decline message for each meeting invitation received. As discussed above, the decline message (e.g., email) may automatically be populated (or appended) with the event, event dates, etc. in the appropriate fields. The meeting details may also be written to a log for future use, as discussed above.

An example algorithm implementing the steps of FIG. 3 is provided below. It should be understood that the algorithm below is an exemplary algorithm and should not be considered a limiting feature of the invention. In other words, the invention contemplates other algorithms which can be implemented to process the steps of FIG. 3.

```
user selects/chooses scheduled events.
x days prior to the event, user is asked to confirm scheduled event
if scheduled event not confirmed
    then
        {
        do not modify meeting details on scheduled event days and
remove schedule event days from vacation calendar.
        for any meeting invites that arrive, accept as tentative
        }
if scheduled event confirmed
{
    for each meeting details on the schedule event day (s)
        if you are the chair of the meeting
        then
            {auto cancel or reschedule the meeting
```

-continued

```
            compose template email
                extract invites from meeting details and use for the to section of the email
                    extract subject and append to subject of template.
                    extract meeting date, time, and subject and append the body of the template
                send email
                write meeting details to logfile}
            if you are not the chair of the meeting then
                {auto decline the meeting
                compose template email
                    extract chair from meeting details and use for the to section of the email
                        extract subject and append to subject of template.
                        extract meeting date, time, and subject and append the body of the template
                    send email
                    write meeting details to logfile}
        for each meeting invite received
            auto decline the meeting and include event and event dates in the body of the decline notice
                write details to logfile
}
```

While the invention has been described in terms of embodiments, those skilled in the art will recognize that the invention can be practiced with modifications and in the spirit and scope of the appended claims.

What is claimed is:

1. A method for use in calendar management, the method comprising:
    receiving, by an invitee at a first computing device, an invitation to an event from a second computing device via a first computer communication link;
    generating, by a processor in response to instructions stored on a computer readable non-transitory medium, a scheduled event, wherein generating the scheduled event includes storing information representing the scheduled event in an electronic representation of a calendar associated with the invitee;
    determining, by a processor in response to instructions stored on a computer readable non-transitory medium, whether the invitee is designated as a chair of the event by:
        extracting information indicating a designated chair from the invitation, and
        determining whether the information indicating the designated chair indicates the invitee;
    determining, by a processor in response to instructions stored on a computer readable non-transitory medium, whether the event conflicts with the scheduled event by:
        identifying a start value and an end value for the scheduled event from the information representing the scheduled event in the electronic representation of the calendar associated with the invitee,
        identifying a start value and an end value for the event from the invitation, and
        determining whether the event conflicts with the scheduled event based on at least two of the start value of the event, the end value of the event, the start value of the scheduled event, or the end value of the scheduled event;
    determining, by a processor in response to instructions stored on a computer readable non-transitory medium, whether the scheduled event is an unconfirmed event by identifying information indicating whether the scheduled event is confirmed from the information representing the scheduled event in the electronic representation of the calendar associated with the invitee;
    extracting, by a processor in response to instructions stored on a computer readable non-transitory medium, a value of a detail of the event from the invitation;
    populating, by a processor in response to instructions stored on a computer readable non-transitory medium, a response electronic message with the value of the detail;
    including, by a processor in response to instructions stored on a computer readable non-transitory medium, a tentative acceptance indication in the response electronic message on a condition that the event conflicts with the scheduled event, the scheduled event is an unconfirmed event, and the invitee is not designated as the chair of the event;
    including, by a processor in response to instructions stored on a computer readable non-transitory medium, a tentative acceptance indication in the response electronic message on a condition that the event conflicts with the scheduled event, the scheduled event is an unconfirmed event, and generating the scheduled event is performed before receiving the invitation;
    including, by a processor in response to instructions stored on a computer readable non-transitory medium, a tentative acceptance indication in the response electronic message on a condition that the event conflicts with the scheduled event, the scheduled event is a confirmed event, the invitee is designated as the chair of the event, and generating the scheduled event is performed before receiving the invitation; and
    sending the response electronic message from the first computer to the second computer via a second computer communication link.

2. The method of claim 1, further comprising:
    in response to receiving, via a user interface, information indicating a cancelation of the scheduled event, restoring, by a processor in response to instructions stored on a computer readable non-transitory medium, the event by including information representing the event in the electronic representation of the calendar associated with the invitee; and
    in response to receiving, via a third computer communication link, information indicating a cancelation of the scheduled event, restoring, by a processor in response to instructions stored on a computer readable non-transitory medium, the event by including information representing the event in the electronic representation of the calendar associated with the invitee.

3. The method of claim 1, wherein the response electronic message is based on an electronic template including a field and populating the response electronic message includes populating the field by including information extracted from the electronic template in the response electronic message and replacing the field with the value of the detail.

4. The method of claim 1, further comprising:
    saving, by a processor in response to instructions stored on a computer readable non-transitory medium, the detail to a log by writing the value of the detail to a log file.

5. The method of claim 4, further comprising:
    in response to receiving, via a user interface, information indicating a cancelation of the scheduled event, retrieving, by a processor in response to instructions stored on a computer readable non-transitory medium, the detail from the log by reading the value of the detail from the log file; and
    in response to receiving, via a third computer communication link, information indicating a cancelation of the scheduled event, retrieving, by a processor in response to instructions stored on a computer readable non-transitory medium, the detail from the log by reading the value of the detail from the log file.

6. The method of claim 5, further comprising:
restoring, by a processor in response to instructions stored on a computer readable non-transitory medium, the detail by including information indicating the value of the detail in the electronic representation of the calendar associated with the invitee; and
removing, by a processor in response to instructions stored on a computer readable non-transitory medium, the scheduled event by:
identifying information representing the scheduled event in the electronic representation of the calendar associated with the invitee, and
removing the including information indicating the scheduled even from the electronic representation of the calendar associated with the invitee.

7. The method of claim 1, further comprising:
providing, by a processor in response to instructions stored on a computer readable non-transitory medium, a prompt, via a user interface, indicating a request to confirm the scheduled event.

8. The method of claim 1, further comprising:
automatically rescheduling, by a processor in response to instructions stored on a computer readable non-transitory medium, the event to a non-conflicting time, on a condition that the invitee is designated as the chair, the event conflicts with the scheduled event, receiving the invitation is performed before generating the scheduled event, and the scheduled event is a confirmed event, wherein automatically rescheduling the event includes:
identifying an invited attendee, other than the invitee, of the event by extracting an identifier representing the invited attendee from the invitation,
receiving information indicating availability for the invited attendee to attend the rescheduled event from the second computing device via a third computer communication link,
determining the non-conflicting time based on the information indicating availability for the invited attendee and the electronic representation of the calendar associated with the invitee, such that a percentage of available invitees for the event at the non-conflicting time is greater than a defined threshold,
including information representing the rescheduled event in the electronic representation of the calendar associated with the invitee,
generating an electronic message indicating a request to reschedule the event to the non-conflicting time, and
sending the electronic message indicating the request to reschedule the event to the non-conflicting time to the invited attendee via a fourth computer communication link.

9. The method of claim 8, further comprising:
in response to a cancelation of the scheduled event:
using, by a processor in response to instructions stored on a computer readable non-transitory medium, a log file to generate an electronic message indicating a request to reschedule the event to an original time by:
reading information representing the event from the log file, the information representing the event including an indication of the original time, wherein the original time is a time indicated in the invitation to the event, and
populating the electronic message with the information representing the event from the log file; and
sending, by a processor in response to instructions stored on a computer readable non-transitory medium, the electronic message via a fifth computer communication link.

10. The method of claim 1, further comprising:
creating, by a processor in response to instructions stored on a computer readable non-transitory medium, a profile on a server or a client, wherein creating the profile includes receiving user input representing at least a portion of the profile, and wherein creating the profile includes storing information representing the profile in a computer readable non-transitory medium, wherein the profile includes at least one of:
a conflict resolution preference associated with the invitee;
a conflict response template configured for population using the value of the detail;
a time period indicating a maximum confirmation date associated with the scheduled event; or
a response threshold indicating a percentage of invited attendees.

11. An apparatus for use in calendar management, the apparatus comprising:
a memory configured to store instructions, wherein the memory is a computer readable non-transitory medium; and
a processor configured to execute the instructions to:
receive, by an invitee, an invitation to an event from an external computing device via a first computer communication link;
generate a scheduled event, including storing information representing the scheduled event in an electronic representation of a calendar associated with the invitee;
determine whether the invitee is designated as a chair of the event by:
extracting information indicating a designated chair from the invitation, and
determining whether the information indicating the designated chair indicates the invitee;
determine whether the event conflicts with the scheduled event by:
identifying a start value and an end value for the scheduled event from the information representing the scheduled event in the electronic representation of the calendar associated with the invitee,
identifying a start value and an end value for the event from the invitation, and
determining whether the event conflicts with the scheduled event based on at least two of the start value of the event, the end value of the event, the start value of the scheduled event, or the end value of the scheduled event;
extract a value of a detail of the event from the invitation;
populate a response electronic message with the value of the detail;
include a tentative acceptance indication in the response electronic message on a condition that the event conflicts with the scheduled event, the scheduled event is an unconfirmed event, and the invitee is not designated as the chair of the event;
include a tentative acceptance indication in the response electronic message on a condition that the event conflicts with the scheduled event, the scheduled event is an unconfirmed event, and generating the scheduled event is performed before receiving the invitation;
include a tentative acceptance indication in the response electronic message on a condition that the event conflicts with the scheduled event, the scheduled event is a confirmed event, the invitee is designated as the chair of the event, and generating the scheduled event is performed before receiving the invitation; and
send the response electronic message to the second computer via a second computer communication link.

12. The apparatus of claim 11, wherein the processor is configured to:
in response to receiving, via a user interface, information indicating a cancelation of the scheduled event, restore the event by including information representing the event in the electronic representation of the calendar associated with the invitee; and
in response to receiving, via a third computer communication link, information indicating a cancelation of the scheduled event, restore the event by including information representing the event in the electronic representation of the calendar associated with the invitee.

13. The apparatus of claim 11, wherein the response electronic message is based on an electronic template including a field and the wherein the processor is configured to populate the response electronic message by including information extracted from the electronic template in the response electronic message and replacing the field with the value of the detail.

14. The apparatus of claim 11, wherein the processor is configured to:
save the detail to a log by writing the value of the detail to a log file.

15. The apparatus of claim 14, wherein the processor is configured to:
in response to receiving, via a user interface, information indicating a cancelation of the scheduled event, retrieve the detail from the log by reading the value of the detail from the log file, and
in response to receiving, via a third computer communication link, information indicating a cancelation of the scheduled event, retrieve the detail from the log by reading the value of the detail from the log file.

16. The apparatus of claim 11, wherein the processor is configured to:
restore the detail by including information indicating the value of the detail in the electronic representation of the calendar associated with the invitee; and
remove the scheduled event by:
identifying information representing the scheduled event in the electronic representation of the calendar associated with the invitee, and
removing the including information indicating the scheduled event from the electronic representation of the calendar associated with the invitee.

17. The apparatus of claim 11, wherein the processor is configured to:
generate a prompt for display via a user interface, the prompt indicating a request to confirm the scheduled event.

18. The apparatus of claim 11, wherein the processor is configured to:
automatically reschedule the event to a non-conflicting time, on a condition that the invitee is designated as the chair, the event conflicts with the scheduled event, receiving the invitation is performed before generating the scheduled event, and the scheduled event is a confirmed event, wherein the processor is configured to automatically reschedule the event by:
identifying an invited attendee, other than the invitee, of the event by extracting an identifier representing the invited attendee from the invitation,
receiving information indicating availability for the invited attendee to attend the rescheduled event from the second computing device via a third computer communication link,
determining the non-conflicting time based on the information indicating availability for the invited attendee and the electronic representation of the calendar associated with the invitee, such that a percentage of available invitees for the event at the non-conflicting time is greater than a defined threshold,
including information representing the rescheduled event in the electronic representation of the calendar associated with the invitee,
generating an electronic message indicating a request to reschedule the event to the non-conflicting time, and
sending the electronic message indicating the request to reschedule the event to the non-conflicting time to the invited attendee via a fourth computer communication link.

19. The apparatus of claim 18, wherein the processor is configured to:
in response to a cancelation of the scheduled event:
generate a message indicating a request to reschedule the meeting to an original time using a log file; and
send the message.

20. The apparatus of claim 11, wherein the processor is configured to:
create a profile including at least one of:
a conflict resolution preference associated with the invitee;
a conflict response template configured for population using the value of the detail;
a time period indicating a maximum confirmation date associated with the scheduled event; or
a response threshold indicating a percentage of invited attendees, wherein creating the profile includes receiving user input representing at least a portion of the profile, and wherein creating the profile includes storing information representing the profile in a computer readable non-transitory medium.

21. A method for use in calendar management, the method comprising:
receiving, by an invitee at a first computing device, an invitation to an event from a second computing device via a first computer communication link;
generating, by a processor in response to instructions stored on a computer readable non-transitory medium, a scheduled event, wherein generating the scheduled event includes storing information representing the scheduled event in an electronic representation of a calendar associated with the invitee;
determining, by a processor in response to instructions stored on a computer readable non-transitory medium, whether the invitee is designated as a chair of the event by:
extracting information indicating a designated chair from the invitation, and
determining whether the information indicating the designated chair indicates the invitee;
determining, by a processor in response to instructions stored on a computer readable non-transitory medium, whether the event conflicts with the scheduled event by:

identifying a start value and an end value for the scheduled event from the information representing the scheduled event in the electronic representation of the calendar associated with the invitee, identifying a start value and an end value for the event from the invitation, and determining whether the event conflicts with the scheduled event based on at least two of the start value of the event, the end value of the event, the start value of the scheduled event, or the end value of the scheduled event;

determining, by a processor in response to instructions stored on a computer readable non-transitory medium, whether the scheduled event is an unconfirmed event by identifying information indicating whether the scheduled event is confirmed from the information representing the scheduled event in the electronic representation of the calendar associated with the invitee;

identifying, by a processor in response to instructions stored on a computer readable non-transitory medium,, a delegate chair by parsing a plurality of invited attendees and selecting an invited attendee from the plurality of invited attendees on a condition that the event conflicts with the scheduled event, the invitee is designated as the chair of the event, and receiving the invitation is performed before generating the scheduled event; and sending, by a processor in response to instructions stored on a computer readable non-transitory medium, a delegate chair request electronic message to the identified delegate chair via a second computer communication link.

22. The method of claim 21, further comprising, in response to receiving via a third computer communication link an electronic message including a decline indication from the delegate chair, sending, via a fourth computer communication link, a cancelation response electronic message to the plurality of invited attendees.

* * * * *